(12) United States Patent
Ryu et al.

(10) Patent No.: US 10,807,479 B2
(45) Date of Patent: Oct. 20, 2020

(54) BATTERY CHARGING SYSTEM FOR ELECTRIC VEHICLE CHARGING STATION

(71) Applicant: LG Chem, Ltd., Seoul (KR)

(72) Inventors: Sang-Woo Ryu, Daejeon (KR); Sung-Won Seo, Daejeon (KR); Jeong-O Mun, Daejeon (KR); Ji-Su Yoon, Daejeon (KR); Yoon-Koo Lee, Daejeon (KR); Hee-Jun Jin, Daejeon (KR); Mi-Geum Choi, Daejeon (KR)

(73) Assignee: LG Chem, Ltd. (KR)

( * ) Notice: Subject to any disclaimer, the term of this patent is extended or adjusted under 35 U.S.C. 154(b) by 178 days.

(21) Appl. No.: 16/094,095

(22) PCT Filed: Jan. 15, 2018

(86) PCT No.: PCT/KR2018/000685
§ 371 (c)(1),
(2) Date: Oct. 16, 2018

(87) PCT Pub. No.: WO2018/131971
PCT Pub. Date: Jul. 19, 2018

(65) Prior Publication Data
US 2020/0009975 A1    Jan. 9, 2020

(30) Foreign Application Priority Data

Jan. 16, 2017   (KR) .................. 10-2017-0007025

(51) Int. Cl.
*B60L 53/302*   (2019.01)
*B60L 58/26*    (2019.01)
(Continued)

(52) U.S. Cl.
CPC ............... *B60L 50/50* (2019.02); *B60L 53/14* (2019.02); *B60L 53/302* (2019.02); *B60L 58/26* (2019.02)

(58) Field of Classification Search
CPC ......... B60L 53/302; B60L 53/14; B60L 58/26
(Continued)

(56) References Cited

U.S. PATENT DOCUMENTS 5,606,239 A * 2/1997 Schumann ............... B60K 1/04
336/55
5,982,152 A * 11/1999 Watanabe et al. ...... B60L 58/21
320/150

(Continued)

FOREIGN PATENT DOCUMENTS

JP     2004264103 A   9/2004
JP        4620125 B2   1/2011
(Continued)

OTHER PUBLICATIONS

Search report from International Application No. PCT/KR2018/000685, dated May 9, 2018.

*Primary Examiner* — Sun J Lin
(74) *Attorney, Agent, or Firm* — Lerner, David, Littenberg, Krumholz & Mentlik, LLP

(57) ABSTRACT

Disclosed herein is a battery charging system of an electric vehicle charging station, the battery charging system including: a charging unit configured to supply an electrical power to charge a battery of an electric vehicle; a charging cable connected to the charging unit and having a connector attached thereto to correspond to an inlet of the electric vehicle; and a cooling unit disposed at a location where the electric vehicle is parked in charging to supply a cooling air toward the battery of the electric vehicle.

9 Claims, 7 Drawing Sheets

(51) Int. Cl.
*B60L 53/14* (2019.01)
*B60L 50/50* (2019.01)

(58) Field of Classification Search
USPC .......................................................... 320/109
See application file for complete search history.

(56) References Cited

U.S. PATENT DOCUMENTS

| | | | |
|---|---|---|---|
| 8,054,039 B2* | 11/2011 | Bauerle et al. | B60L 53/14 320/109 |
| 8,183,819 B2* | 5/2012 | Sugano | B60L 53/55 320/103 |
| 9,252,621 B2* | 2/2016 | Miyano | H01M 10/625 |
| 9,555,715 B2* | 1/2017 | Sugano | B60L 53/64 |
| 9,566,954 B2* | 2/2017 | Moskowitz | B60L 58/26 |
| 2008/0258682 A1 | 10/2008 | Li | |
| 2012/0041855 A1* | 2/2012 | Sterling et al. | B60L 53/665 705/34 |
| 2013/0033227 A1 | 2/2013 | Gibbons, Jr. | |
| 2013/0307477 A1 | 11/2013 | Reinschke | |
| 2014/0285139 A1 | 9/2014 | Ann et al. | |
| 2015/0306974 A1 | 10/2015 | Mardall et al. | |
| 2016/0052421 A1 | 2/2016 | Galamb | |

FOREIGN PATENT DOCUMENTS

| | | |
|---|---|---|
| JP | 2016522537 A | 7/2016 |
| KR | 20110018472 A | 2/2011 |
| KR | 20110008388 U | 8/2011 |
| KR | 20120071074 A | 7/2012 |
| KR | 20120127028 A | 11/2012 |
| KR | 20140115482 A | 10/2014 |

* cited by examiner

BATTERY CHARGING SYSTEM FOR ELECTRIC VEHICLE CHARGING STATION

CROSS-REFERENCE TO RELATED APPLICATIONS

The present application is a national phase entry under 35 U.S.C. § 371 of International Application No. PCT/KR2018/000685, filed on Jan. 15, 2018, published in Korean, which claims priority from Korean Patent Application No. 10-2017-0007025, filed on Jan. 16, 2017, the disclosures of which are hereby incorporated herein by reference.

TECHNICAL FIELD

The present disclosure relates to a battery charging system of an electric vehicle charging station, and more particularly, to a battery charging system of an electric vehicle charging station, which has an improved structure for cooling a battery of an electric vehicle.

BACKGROUND ART

Unlike general vehicles that use fuel such as gasoline or diesel as a power source, an electric vehicle uses a battery power as a power source. Thus, a connector of a charger corresponding to an inlet mounted at an electric vehicle is connected thereto to charge the battery.

As shown in FIG. 1, an electric vehicle charging station includes a charger 1 for supplying a charging power, and a connector attached to an end of a charging cable 3 is plugged into an electric vehicle 2 to charge a battery 4.

Generally, a charging method of the electric vehicle may be classified into rapid charging demanding a charging time of about 30 minutes and slow charging demanding a charging time of about 4 to 6 hours. In the charging process, heat is generated at the battery of the electric vehicle, and thus the electric vehicle should have a cooling device to protect the battery. The cooling device should have sufficient cooling capacity to cope with rapid charging.

In relation to a battery protecting device of an electric vehicle, Patent Literature 1 discloses an electric vehicle battery protecting device, which includes an air conditioner installed at the electric vehicle and operated using a battery as a power source, an air inflow unit for introducing a room air of the electric vehicle into the battery, and an air conditioning control unit for controlling the operation of the air conditioner and the air inflow unit so that the battery temperature measured by a battery temperature measuring unit is within a predetermined appropriate temperature range.

However, since the air conditioner is installed at the electric vehicle, the conventional battery protecting device has weak points such as an increased cost of raw materials and a lowered energy density of the battery.

RELATED LITERATURES

Patent Literature

Patent Literature 1: Korean Unexamined Patent Publication No. 2012-0071074

DISCLOSURE

Technical Problem

The present disclosure is designed to solve the problems of the related art, and therefore the present disclosure is directed to providing a battery charging system of an electric vehicle charging station, in which an arrangement of a cooling device for cooling a battery of an electric vehicle is improved.

Technical Solution

In one aspect of the present disclosure, there is provided a battery charging system of an electric vehicle charging station, comprising: a charging unit configured to supply a power to charge a battery of an electric vehicle; a charging cable connected to the charging unit and having a connector attached thereto to correspond to an inlet of the electric vehicle; and a cooling unit disposed at a point where the electric vehicle stops in charging to supply a cooling air toward the battery of the electric vehicle.

The cooling unit may be a blowing fan disposed to face upward from the ground to blow an air to a bottom of the electric vehicle.

The cooling unit may be installed to be buried in the ground where the electric vehicle stops.

The cooling unit may be operated during a charging process to blow an air.

A controller for controlling an operation of the cooling unit may be provided to the charging unit.

The battery charging system of an electric vehicle charging station may further comprise a cooling stage provided at the ground where the electric vehicle stops to accommodate the cooling unit.

The cooling stage may include: a stage body buried in the ground where the electric vehicle stops; and a moving unit provided at the stage body to move a location of the cooling unit.

The moving unit may move the cooling unit in at least one of a horizontal direction and a vertical direction with respect to the ground.

The cooling stage may include a heat sensing unit provided at the stage body to sense a heat of the electric vehicle.

The cooling stage may include a gate configured to open or close the ground depending on whether the cooling unit operates.

Advantageous Effects

According to the present disclosure, it is possible to rapidly charge a battery of an electric vehicle while efficiently cooling the battery even though a high capacity cooling device for rapid charging is not separately provided to the battery.

Therefore, when the present disclosure is applied, there is no need to add a high capacity cooling device for rapid charging separately in each electric vehicle, and thus the structure of a battery pack mounted to the electric vehicle is simplified to reduce costs. Moreover, since the space occupied by a cooling device is not separately required, it is possible to increase the energy density within a limited volume of the electric vehicle.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
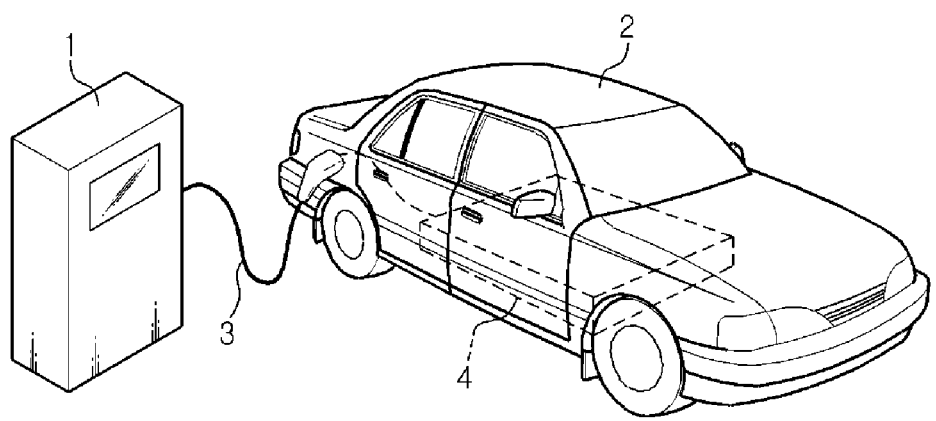
FIG. 1 is a perspective view showing a conventional battery charging system of an electric vehicle charging station.
Figure 2:
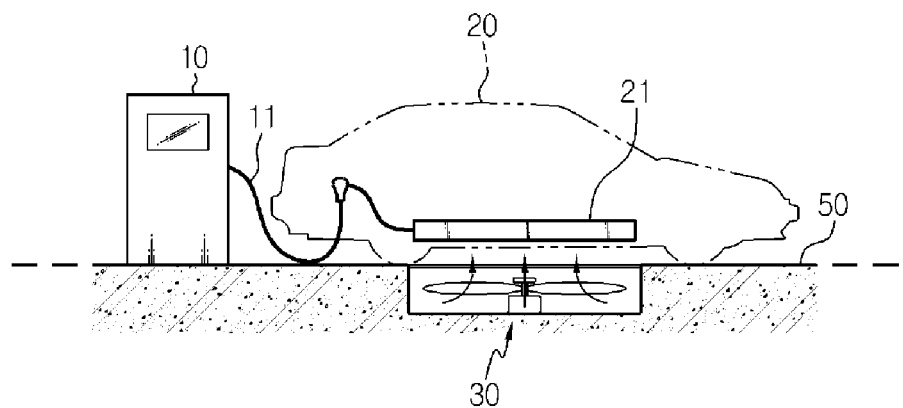
FIG. 2 is a partial cross-sectioned view showing a battery charging system of an electric vehicle charging station according to an embodiment of the present disclosure.
Figure 3:
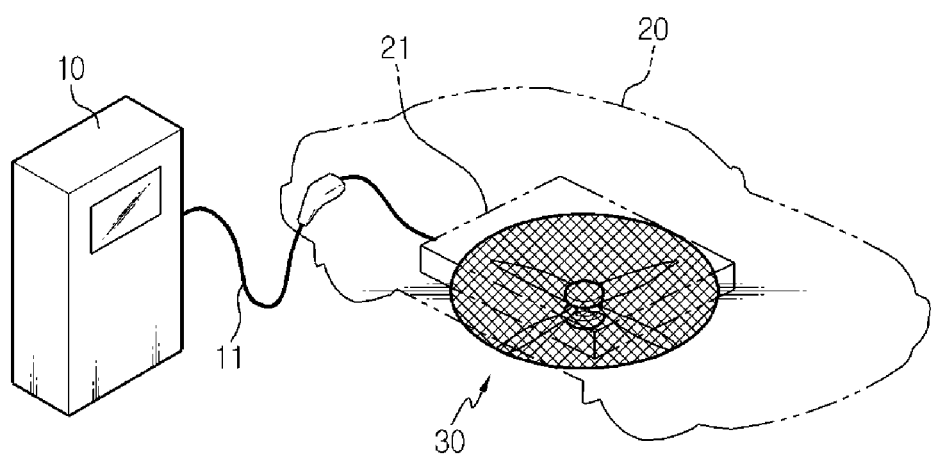
FIG. 3 is a perspective view showing the battery charging system of an electric vehicle charging station according to an embodiment of the present disclosure.

FIG. 2 is a partial cross-sectioned view showing a battery charging system of an electric vehicle charging station according to an embodiment of the present disclosure, and FIG. 3 is a perspective view of FIG. 2.

Referring to FIGS. 2 and 3, a battery charging system of an electric vehicle charging station according to an embodiment of the present disclosure includes a charging unit 10, a charging cable 11 and a cooling unit 30.

The charging unit 10 is supplied with a power from a power supply system and supplies the power to charge a battery 21 of an electric vehicle 20. The charging unit 10 may be classified into a slow charger for receiving, for example, a power of AC 220V and a rapid charger for receiving, for example, a power of AC 380V, from a prevailing power supply facility. In addition, the charging unit 10 may be configured to output a prevailing voltage for charging an electric vehicle, such as AC 220V, DC 220V, DC 50 to 450V, DC 500V, and the like.

The charging cable 11 is an interface for connecting the charging unit 10 and the electric vehicle 20 and has a connector of a predetermined standard attached to an end of the cable and corresponding to an inlet of the electric vehicle 20.

The cooling unit 30 is disposed at the ground 50 at a point where the electric vehicle 20 stops and supplies a cooling air toward the battery 21 of the electric vehicle 20. At the point where the electric vehicle 20 stops, the charging cable 11 should be connectable to the inlet of the electric vehicle 20.

The cooling unit 30 is configured by a blowing fan disposed to face upward from the ground 50 of a charging station. Since the battery 21 of the electric vehicle 20 is mounted inside the electric vehicle 20, for example, near a bottom thereof, if a cooling air is blown toward the battery 21, the temperature of the battery 21 may be efficiently lowered during the charging process. The cooling unit 30 is installed to be buried at a predetermined depth in the ground 50 near the charging unit 10 so as to blow an air toward the battery 21 of the electric vehicle 20.

The cooling unit 30 is selectively operated during the charging process to blow an air, thereby preventing the temperature of the battery 21 from rising. The cooling unit 30 is preferably connected to the charging unit 10 for controlling the cooling unit 30 and supplying power thereto. Accordingly, a controller (not shown) for controlling the operation of the cooling unit 30 is provided at one side of the charging unit 10, and an operation button for operating the charging unit 10 may be provided on an operation panel of the charging unit 10. In addition, the controller may be configured to automatically operate the cooling unit 30 by sensing a charging standby state of the electric vehicle 20 with a predetermined sensor.

In order to maximize the cooling efficiency, it is advantageous that the cooling unit 30 is arranged to substantially exactly face the battery 21. To this end, at the ground 50 of the point where the electric vehicle 20 stops, as shown in FIG. 3, the cooling unit 30 is preferably exposed to the outside so that the electric vehicle 20 stops at a regular position and thus the cooling unit 30 and the battery 21 may be aligned with each other.

In the battery charging system of the electric vehicle charging station according to an embodiment of the present disclosure configured as above, in a state where the electric vehicle 20 stops above the cooling unit 30 provided at the charging station, the battery 21 loaded in the electric vehicle 20 is charged, and also an air is blown toward the battery 21 of the electric vehicle 20 by means of the cooling unit 30 to efficiently cool the battery 21.

Thus, even though the battery 21 of the electric vehicle 20 does not include a high capacity cooling device for rapid charging separately, the battery 21 may be charged while being efficiently cooled.

Figure 4:
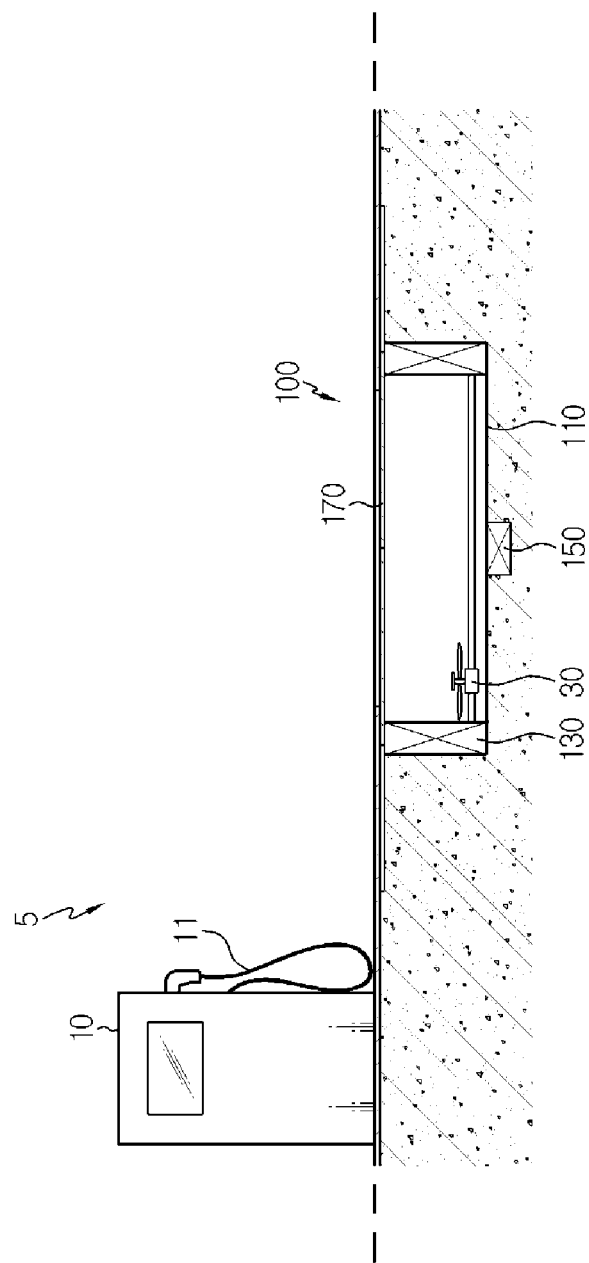
FIG. 4 is a diagram for illustrating a battery charging system of an electric vehicle charging station according to another embodiment of the present disclosure.

FIG. 4 is a diagram for illustrating a battery charging system of an electric vehicle charging station according to another embodiment of the present disclosure.

A battery charging system 5 of an electric vehicle charging station according to this embodiment is similar to the battery charging system of the former embodiment, and thus just features different from the former embodiment will be described in detail.

Referring to FIG. 4, the battery charging system 5 of an electric vehicle charging station may include a charging unit 10, a charging cable 11, a cooling unit 30 and a cooling stage 100.

The charging unit 10 and the charging cable 11 are substantially identical or similar to those of the former embodiment and thus will not be explained in detail.

The cooling unit 30 may be configured using a blowing fan as in the former embodiment. The cooling unit 30 may be accommodated in the cooling stage 100, explained later, so as to be movable therein.

The cooling stage 100 is provided at the ground where the electric vehicle stops and may accommodate the cooling unit 30. The cooling stage 100 may be electrically connected to the controller of the charging unit 10.

The cooling stage 100 may include a stage body 110, a moving unit 130, a heat sensing unit 150 and a gate 170.

The stage body 110 may be provided to be buried in the ground where the electric vehicle stops. The stage body 110 may have an accommodation space in which the cooling unit 30 may be movably accommodated.

The moving unit 130 is provided at the stage body 110 and may move the cooling unit 30. The moving unit 130 may move the cooling unit 30 in at least one of a horizontal direction and a vertical direction with respect to the ground.

The heat sensing unit 150 is provided at the stage body 110 and may sense the heat of the electric vehicle. For this purpose, the heat sensing unit 150 may be provided as an infrared camera capable of sensing heat.

The gate 170 is provided at an upper side of the stage body 100 and may open or close the ground depending on whether the cooling unit 30 operates. Specifically, the gate 170 may open or close the upper side of the stage body 100 by sliding.

Hereinafter, the detailed operation of the battery charging system 5 of the electric vehicle charging station according to this embodiment will be described in detail.

FIGS. 5 to 8 are diagrams for illustrating the operation of the battery charging system of an electric vehicle charging station, depicted in FIG. 4.

Figure 5:
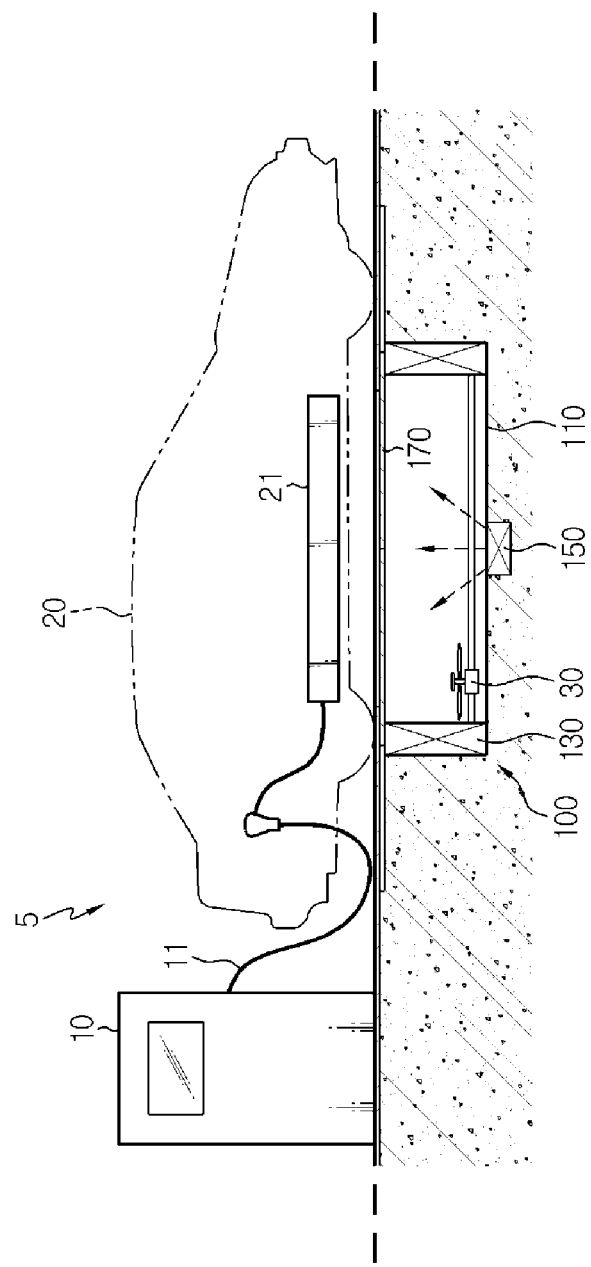
FIGS. 5 to 8 are diagrams for illustrating the operation of the battery charging system of an electric vehicle charging station, depicted in FIG. 4.

Referring to FIG. 5, the electric vehicle 20 may be connected to the charging unit 10 through the charging cable 11 of the charging unit 10 for charging the battery 21. After that, the charging unit 10 may charge the battery 21 of the electric vehicle 20.

Here, the electric vehicle 20 may be located above the cooling stage 100. If the electric vehicle 20 is located above the stage body 110 of the cooling stage 100, the heat sensing unit 150 may sense the heat of the electric vehicle 20.

The battery 21 may be provided at different positions of the electric vehicle 20 depending on the type of vehicle. In this embodiment, the heat sensing unit 150 may accurately specify a location where the battery 21 is provided at each electric vehicle 20 according to the type of vehicle.

Figure 6:
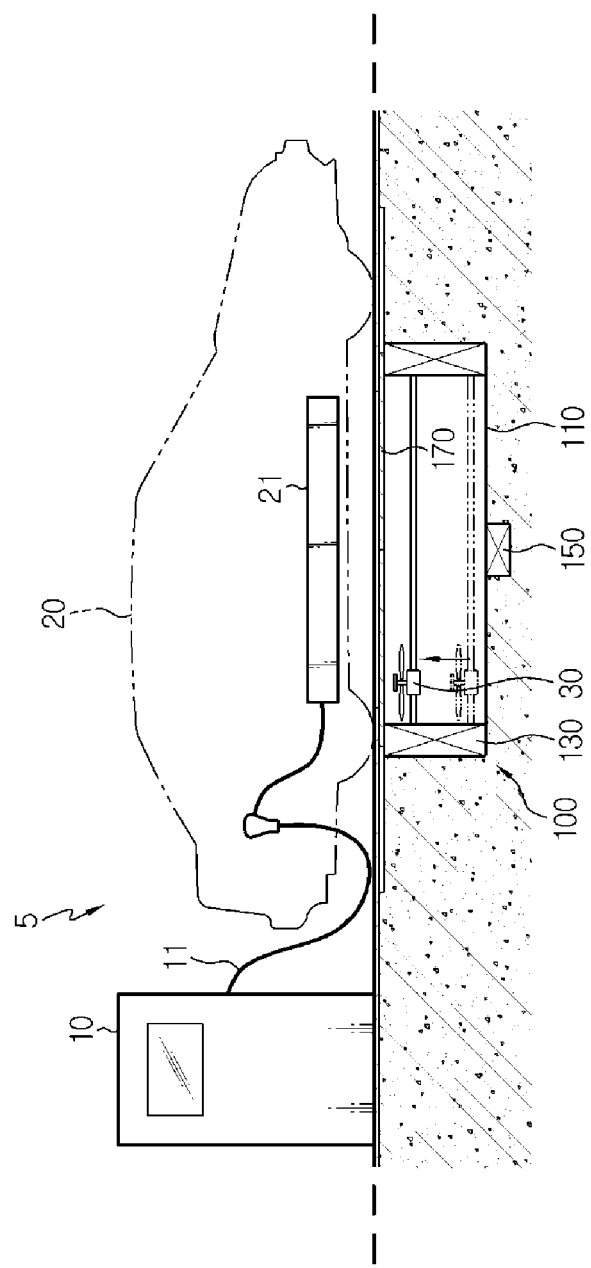
Figure 7:
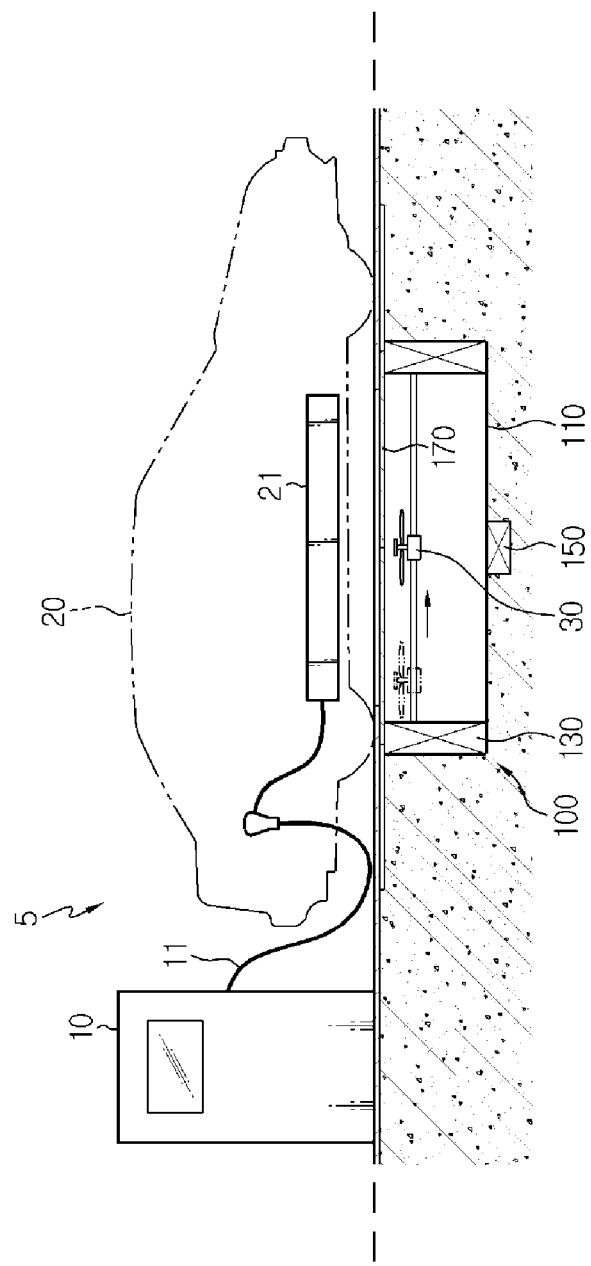

Referring to FIGS. 6 and 7, after that, the cooling stage 100 may move the cooling unit 30 to a location below a heating region where the battery 21 is located, by means of the moving unit 130.

Figure 8:
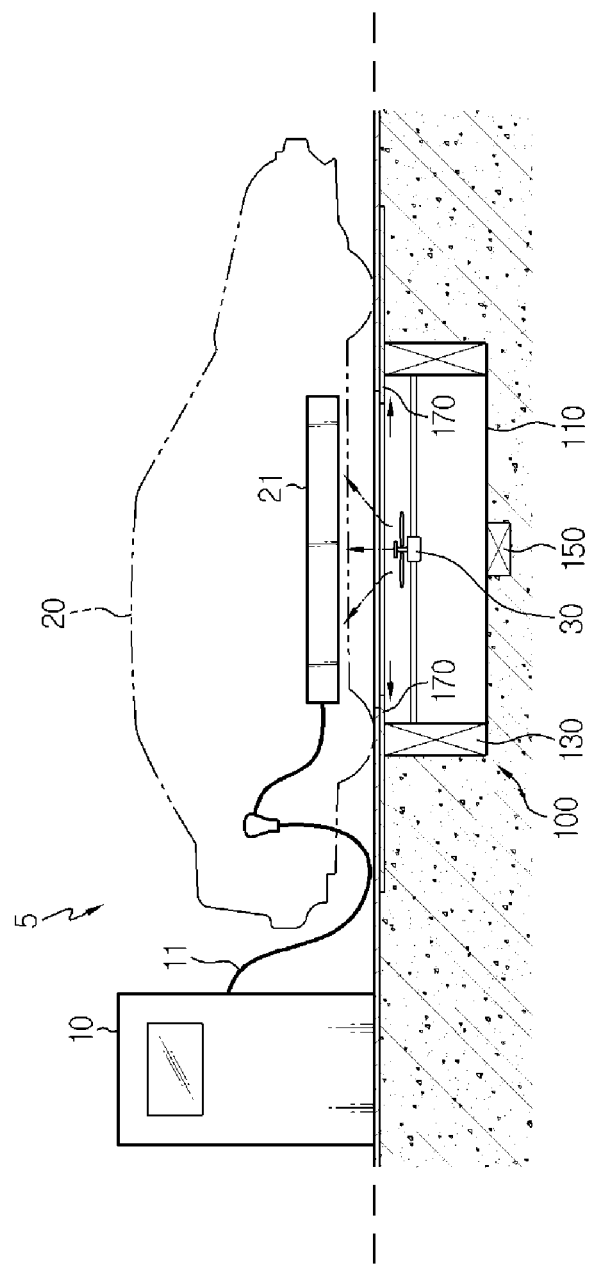

Referring to FIG. 8, if the cooling unit 30 is disposed below the region where the battery 21 is provided, the gate 170 of the cooling stage 100 may be opened. After that, if the gate 170 is opened, the cooling unit 30 may blow an air to the heating region where the battery 21 is provided.

As described above, in this embodiment, when the battery 21 of the electric vehicle 20 is charged, the cooling unit 30 may be moved to a heating region of the electric vehicle 20 where the battery 21 is provided and then blow an air thereto by means of the cooling stage 100.

Accordingly, in this embodiment, even though the battery 21 is provided at different locations of the electric vehicle 20 depending on the type of vehicle, it is possible to accurately specify the heating region of the battery 21 and then move the cooling unit 30 to the heating region. Therefore, it is possible to further enhance the cooling efficiency at the heating region during the charging process.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery charging system of an electric vehicle charging station, the battery charging system comprising:
    a charging unit configured to supply an electrical power to charge a battery of an electric vehicle;
    a charging cable connected to the charging unit and having a connector attached thereto to correspond to an inlet of the electric vehicle; and
    a cooling unit disposed at a location where the electric vehicle is parked in charging to supply a cooling air toward the battery of the electric vehicle,
    wherein the cooling unit is a blowing fan disposed with a face upward from the ground to blow the cooling air to a bottom of the electric vehicle.

2. The battery charging system according to claim 1, wherein the cooling unit is installed to be buried in the ground where the electric vehicle is parked.

3. The battery charging system according to claim 1, wherein the cooling unit is operated during a charging process to blow the cooling air.

4. The battery charging system according to claim 3, wherein a controller for controlling an operation of the cooling unit is provided to the charging unit.

5. A battery charging system of an electric vehicle charging station, the battery charging system comprising:
    a charging unit configured to supply an electrical power to charge a battery of an electric vehicle;
    a charging cable connected to the charging unit and having a connector attached thereto to correspond to an inlet of the electric vehicle;
    a cooling unit disposed at a location where the electric vehicle is parked in charging to supply a cooling air toward the battery of the electric vehicle; and
    a cooling stage provided in the ground at the location where the electric vehicle is parked to accommodate the cooling unit.

6. The battery charging system according to claim 5, wherein the cooling stage includes:
    a stage body buried in the ground at the location where the electric vehicle is parked; and
    a moving unit provided at the stage body to move a location of the cooling unit.

7. The battery charging system according to claim 6, wherein the moving unit moves the cooling unit in at least one of a horizontal direction and a vertical direction with respect to the ground.

8. The battery charging system according to claim 6, wherein the cooling stage includes a heat sensing unit provided at the stage body to sense a heat of the electric vehicle.

9. The battery charging system according to claim 6, wherein the cooling stage includes a gate configured to open or close the ground depending on whether or not the cooling unit is operating.

* * * * *